United States Patent
Harrow et al.

(10) Patent No.: US 11,055,682 B2
(45) Date of Patent: Jul. 6, 2021

(54) AUTHENTICATED SELF-SERVICE TERMINAL (SST) ACCESS

(71) Applicant: NCR Corporation, Duluth, GA (US)

(72) Inventors: Charles Harrow, Dundee (GB); Avril Kidd, Dundee (GB); Colin Herkes, Fife (GB)

(73) Assignee: NCR Corportation, Atlanta, GA (US)

( * ) Notice: Subject to any disclaimer, the term of this patent is extended or adjusted under 35 U.S.C. 154(b) by 765 days.

(21) Appl. No.: 14/512,808

(22) Filed: Oct. 13, 2014

(65) Prior Publication Data
US 2016/0104140 A1    Apr. 14, 2016

(51) Int. Cl.
| | |
|---|---|
| *G06Q 20/18* | (2012.01) |
| *G06F 21/35* | (2013.01) |
| *G07F 19/00* | (2006.01) |
| *G06F 21/36* | (2013.01) |
| *G06Q 20/32* | (2012.01) |
| *G06Q 20/38* | (2012.01) |
| *G06Q 20/40* | (2012.01) |

(52) U.S. Cl.
CPC ............. *G06Q 20/18* (2013.01); *G06F 21/35* (2013.01); *G06F 21/36* (2013.01); *G06Q 20/322* (2013.01); *G06Q 20/3226* (2013.01); *G06Q 20/382* (2013.01); *G06Q 20/40* (2013.01); *G07F 19/209* (2013.01); *G06F 2221/2103* (2013.01)

(58) Field of Classification Search
CPC ........ G06Q 20/18; G06Q 20/38; G06F 21/35; G06F 21/36; G06F 2221/2103; G07F 19/209
See application file for complete search history.

(56) References Cited

U.S. PATENT DOCUMENTS

| | | | |
|---|---|---|---|
| 5,892,900 A | 4/1999 | Ginter et al. | |
| 5,910,987 A * | 6/1999 | Ginter | G06F 21/10 348/E5.006 |
| 8,627,438 B1 * | 1/2014 | Bhimanaik | H04L 63/10 726/9 |
| 8,639,621 B1 * | 1/2014 | Ellis | G06Q 30/0255 705/41 |
| 8,833,661 B2 * | 9/2014 | Terwilliger | G06F 17/30879 235/375 |

(Continued)

FOREIGN PATENT DOCUMENTS

| | | |
|---|---|---|
| EP | 2587432 A1 | 5/2013 |
| WO | 2012/088512 A2 | 6/2012 |

OTHER PUBLICATIONS

Menezes, A. J., Oorschot, P. C., & Vanstone, S. A. (1997). Handbook of Applied Cryptography, doi: 10.1201/9780429466335 (Year: 1997) (Year: 1997).*

(Continued)

*Primary Examiner* — John W Hayes
*Assistant Examiner* — Dennis G Keritsis
(74) *Attorney, Agent, or Firm* — Schwegman, Lundberg & Woessner (57) ABSTRACT

An SST facilitates authentication of a user through an external service via a mobile device operated by the user. The SST also obtains independent verification of an access command sent from a server through a cryptographic peripheral module integrated into the SST before sending a command to grant authenticated access to the SST in response to the access command.

9 Claims, 4 Drawing Sheets

(56) References Cited

U.S. PATENT DOCUMENTS

| | | | |
|---|---|---|---|
| 2005/0153711 A1* | 7/2005 | Ocke | H04L 12/24 |
| | | | 455/456.3 |
| 2011/0296194 A1 | 12/2011 | Herkes et al. | |
| 2012/0102431 A1* | 4/2012 | Krolczyk | G06F 17/30044 |
| | | | 715/790 |
| 2012/0216044 A1* | 8/2012 | Chung | H04L 63/061 |
| | | | 713/182 |
| 2012/0280783 A1 | 11/2012 | Gerhardt et al. | |
| 2013/0307386 A1* | 11/2013 | Martin | G07F 11/00 |
| | | | 312/237 |

OTHER PUBLICATIONS

Menezes A J; Van Oorschot P C; Vanstone S A, Handbook of Applied Cryptography; [CRC Press Series on Discrete Mathematics and Its Applications], CRC Press, Boca Raton, FL, US, Chapter 10: Identification and Entity Authentication ED—pp. 385-424, Oct. 1, 1996 (Oct. 1, 1996), XP001525010, ISBN: 978-0-8493-8523-0 Retrieved from the Internet: URL:http://www.cacr.math.uwaterloo.ca/hac/.

European Search Report dated Aug. 24, 2018 in copending European patent application No. 15 187 883.2.

\* cited by examiner

AUTHENTICATED SELF-SERVICE TERMINAL (SST) ACCESS

BACKGROUND

Service access to an Automated Teller Machine (ATM) is crucial to maintenance and support of the ATM. However, providing secure access to only authenticated personnel is a complex issue: mechanical locks on the top box are not strong, duplicated keys are common because key management is difficult to administrator, and there is no adequate audit as to whom has had access to the top box and for what reason.

In fact, unauthorized ATM top box access is becoming a significant problem in the industry especially in view of the rise in malware and Black Box attacks, both of which exploit the problems associated with securing the ATM top box and override existing weak security controls.

That is, once the top box has been compromised malware and other nefarious devices can be integrated into the ATM to compromise operation of the ATM.

Moreover, the problem is not just limited to ATMs and may be more problematic with other Self-Service Terminals (SSTs) that have even less security precautions in place.

SUMMARY

In various embodiments, methods and a Self-Service Terminal (SST) for authenticated SST access are presented.

According to an embodiment, a method for authenticated SST access is provided. Specifically, an authentication token is presented on a display of an SST and, subsequently, an access command is obtained from a server. Next, a request is made to a peripheral device to validate the access command before processing the access command providing authorized to the SST.

DETAILED DESCRIPTION

Figure 1:
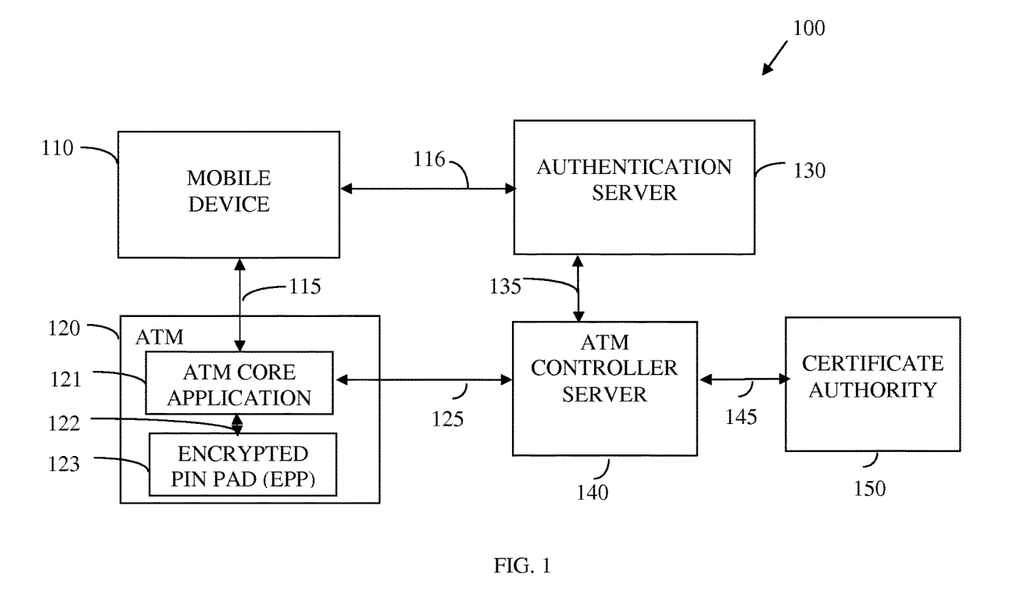
FIG. 1 is a diagram of components for practicing authenticated Self-Service Terminal (SST) access, according to an example embodiment.

FIG. 1 is a diagram 100 of components for practicing authenticated Self-Service Terminal (SST) access, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of authenticated SST access, presented herein and below.

Furthermore, the methods and SST presented herein and below for authenticated SST access can be implemented in whole or in part in one, all, or some combination of the components shown with the diagram 100. The methods are programmed as executable instructions in memory and/or non-transitory computer-readable storage media and executed on one or more processors associated with the components. Each processor specifically configured to process the components of the diagram 100.

Specifically, the diagram 100 permits authenticated SST access to either 1) open a top box and access internal components of the ATM 120 or 2) access an administrative interface to gain access to software resources of the ATM 120. The details of this approach in view of the components, within the diagram 100, are now presented with reference to some embodiments of the FIG. 1 within the context of an SST that is an Automated Teller Machine (ATM) 120.

The diagram 100 includes a customer engineer's mobile device 110, an ATM 120, a remote authentication server 130, an ATM controller server 140, and a certificate authority 150.

The mobile device 110 (using one or more mobile application processing on the mobile device and not shown in the FIG. 1) initially establishes a wired or wireless connection 115 with the ATM 120.

In an embodiment, the mobile device 110 establishes a wireless connection 115 with the ATM 120, via a Bluetooth® connection.

The connection 115 is a request sent from the mobile device 110 and received for processing by the ATM core application 121 (processing on the ATM 120). The request is a request to either 1) open the top box of the ATM 120 to expose internal components of the ATM 120 or 2) gain access to an administrative interface of the ATM 120 to gain access to software resources of the ATM 120.

In response to the request, the ATM core application 121 causes a Quick Response (QR) code or a number (of any configurable length, such as 6 digits) to be presented in a screen on a display of the ATM 120.

Next, the customer engineer uses the mobile device 110 (or a different mobile device) to either scan the QR code or to enter, into an appropriate mobile application, the number.

The mobile application of the mobile device 110 detects the QR code scan or the entered number and contacts the remote authentication server 130 over wireless connection 116, such as via cellular (3G, etc.) or Wi-Fi.

The authentication server 130 then authenticates the customer engineer using any authentication mechanism accepted by the authentication server 130, such as identification and password in combination with a mobile device identifier for the mobile device 110. It is noted that any enterprise required authentication of the customer engineer operating the mobile device 110 can be used by the authentication server 130 through interaction with the mobile application and the user operating the mobile device 110.

Once the authentication server 130 properly authenticates the customer engineer operating the mobile device 110, the authentication server 130 instructs the ATM controller server 140 to either 1) open (via an electronic unlock command to an internal electric lock to the ATM 120) the top box of the ATM 120 for the authenticated customer engineer to access the internal components of the ATM 120 or 2) provide an administrative interface on a display of the ATM 120 for the customer engineer to interact with to access software resources of the ATM 120.

The authentication server 130 communicates with the ATM controller server 140 via a wired connection 135 within a secure environment.

The ATM controller server 140 is also securely connected to the ATM 120 over a wired connection 125 and sends either: 1) an open top box command to the ATM core application 121 or 2) a provide access to an administrative interface command to the ATM core application 121.

At this point, the ATM core application 121 requests a challenge to the access command (open access panel or provide access to the administrative interface) by contacting the Encrypted Pin Pad (EPP) 123 (integrated peripheral device of the ATM 120) over an internal wired connection 122.

The EPP 123 sends the challenge message received from the ATM core application 121 back to the ATM controller server 140 through the ATM core application 121 over connection 135.

The ATM controller server 140 digitally signs the challenge message and sends back over connection 135 to the ATM core application 121, which the ATM core application 121 delivers over 122 to the EPP 123.

The EPP 123 validates and verifies the digital signature of the ATM controller server 140 and when validated sends a message back over 122 to the ATM core application 121 to either 1) unlock the top box of the ATM 120 or 2) provide access to an administrative interface of the ATM 120.

The ATM controller server 140 then makes a note in a log or audit trail that the customer engineer requested the access command for the ATM 120 and that the top box was opened or the administrative interface was provided on the date and time of opening or administrative interface access. This provides a verified audit log or trail for government or enterprise compliance.

The ATM core application 121 sends either: 1) a message or causes an instruction to be sent to an electronic lock associated with the top box of the ATM 120 and the top box is unlocked for access by the customer engineer or 2) provides an administrative interface on a display of the ATM 120 for the customer engineer to access software resources of the ATM 120.

It is noted that in an embodiment, the access command when successfully processed may both open the top box of the ATM 120 and also provide the administrative interface on a display of the ATM 120.

The EPP 123 provides cryptographic assurance to the ATM core application 121 that the access request is legitimate.

During initial configuration of the ATM 120, the ATM controller server 140 generates a key pair (such as public-private key pair, an RSA (Rivest Shamir Adleman (named after inventors' last names), or any other asymmetric encryption technique) key pair for use by the EPP 123 in performing the signature verification. The ATM controller server 140 requests a certificate from certificate authority 150 over connection 145. This configuration takes place out-of-band, outside of the request and before the request is made by the customer engineer to access the ATM 120. The key pair can be provided to the EPP 123 via a direct connection made via a port to the EPP 123, such that the ATM core application 121 is bypassed and does not have access to the key pair. This ensures any corrupted ATM core application 121 never has access to the private portion of the key pair that the EPP 123 utilizes for cryptographic verification of the ATM controller server's signature (discussed above).

A one-time and initial certificate exchange takes place as well where the requested certificate made by the ATM controller server 140 to the certificate authority 150 is provided to the EPP 123 for signature validation in combination with the key pair. The ATM controller server 140 can send the certificate (received from the certificate authority 150) over connection 125 for delivery to the ATM core application 121, which delivers the certificate to the EPP 123 over the internal ATM connection 122. The EPP 123 can authenticate the certificate using its certificate stack and securely stores the certificate. The certificate and the key pair used to validate the signature of the ATM controller server 140 during a request to access the ATM 120.

In an embodiment, the key pair is prefabricated within secure storage of the EPP 123.

In an embodiment, the ATM 120 includes an electronic internal lock that unlocks the top box of the ATM 120 along with one or more physical key slots for physical keys, such that both the electronic lock and a separate mechanical lock require unlocking before access to the top box is given.

In an embodiment, the ATM 120 includes an electronic internal lock that unlocks the top box of the ATM 120 along with one or more physical key slots for physical keys that are associated with a mechanical lock of the ATM's top box, such that when power failure occurs or the ATM core application 121 fails the physical keys can be used to open the top box.

In an embodiment, the ATM 120 includes an electronic internal lock only and no backup or additional mechanical locks that are unlocked via one or more physical keys.

In an embodiment, the mobile device 110 is a smartphone.

In an embodiment, the mobile device 110 is a tablet.

In an embodiment, the mobile device 110 is a laptop computer.

In an embodiment, the mobile device 110 is a wearable processing device.

In an embodiment, the mobile device 110 is a USB device.

In an embodiment, the administrative interface access is achieved via a wireless connection, such as Bluetooth®, with access and interaction to the administrative interface occurring on the mobile device 110 or controlled from the mobile device 110 as presented on a display of the ATM 120.

In an embodiment, the administrative access to access logical resources complies with or assists enterprises in compliance with the Payment Card Industry (PCI) security standards or guidelines.

In an embodiment, the authentication server 130 uses a current physical position resolved for the mobile device 110 (such as via sensors of a Global Positioning Satellite (GPS) device (integrated into the mobile device 110)) as part of the authentication for the mobile device 110 and the customer engineer operating the mobile device 110. This may be required to ensure the mobile device 110 is in proximity to the ATM 120 when issuing the access request and ensure that it is the mobile device 110 in communication with the ATM 120 and not another mobile device that the mobile device 110 is communicating with.

In embodiment, the ATM controller server 140 enforces policies when deciding whether to issue an access command to the ATM core application 121. The policy can be based on customer engineer access rights and/or based on when the top box was last opened or the administrative interface was last provided for interaction. So, the customer engineer and the mobile device 110 may be properly authenticated but evaluation of configurable policies may indicate that the ATM controller server 140 should not issue the access command to the ATM core application 121. This provides added security that can be altered dynamically by changing a policy. This may be useful when the customer engineer is still employed by an enterprise but scheduled to be displaced or leave the employ of the enterprise, such that a policy can be dynamically pushed to the ATM controller server 140 to ensure the customer engineer does not gain access to the ATM's physical or logical (software) components. Other reasons for dynamic policy changes can exists as well and are controlled and deployed by the enterprise as needed for any given security situation. It is also noted that a failed attempt to access the ATM 120 can also be logged and noted by the ATM controller server 140.

One now appreciates how customer engineers can authenticate for access to the ATM 120 for access to hardware components of the ATM 120 and/or software components of the ATM 120. This is done through a proximity-based authentication technique involving multiple parties and devices (the ATM 120, the mobile device 110, the customer engineer operating the mobile device 110, an authentication server 130, and an ATM controller server 140.

Additionally, and in some embodiments, ATMs can be fabricated without mechanical locks requiring physically keys for opening the top boxes of those ATMs; this too can save maintenance and management of physical key distributing and on costs for manufacturing the mechanical locks within the ATMs and manufacturing the physical keys.

Some of these embodiments and other embodiments are now discussed with reference to the FIGS. 2-4.

Figure 2:
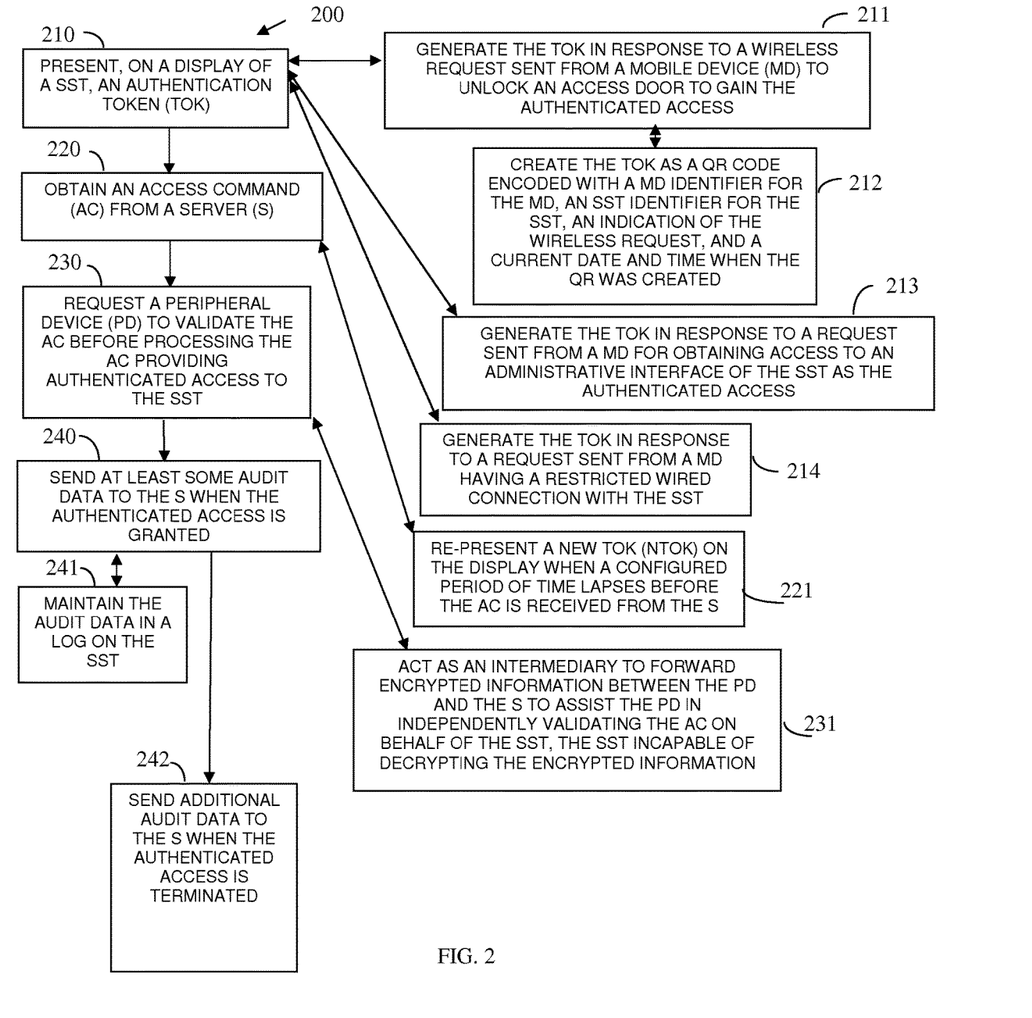
FIG. 2 is a diagram of a method for authenticated SST access, according to an example embodiment.

FIG. 2 is a diagram of a method 200 for authenticated SST access, according to an example embodiment. The software module(s) that implements the method 200 is referred to as an "SST core application." The SST core application is implemented as executable instructions programmed and residing within memory and/or a non-transitory computer-readable (processor-readable) storage medium and executed by one or more processors of an SST. The processor(s) of the SST that executes the customer-assisted application are specifically configured and programmed to process the SST core application. The customer-assisted application has access to one or more network connections during its processing. The network can be wired, wireless, or a combination of wired and wireless.

In an embodiment, the SST is the ATM 120 of the FIG. 1.

In an embodiment, the SST is a kiosk.

In an embodiment, the SST is a self-service checkout Point-of-Sale (POS) device.

In embodiment, the SST has a wireless interface port and module for wirelessly communicating with a mobile device of a user that operates the mobile device. In an embodiment, the wireless communication is Bluetooth®. In an embodiment, the wireless communication is Infrared (IR). In an embodiment, the wirelessly communication is Near Field Communication (NFC). In an embodiment, the wireless communication is Bluetooth® Low Energy (BLE). In an embodiment, the wireless communication is cellular. In an embodiment, the wireless communication is Wi-Fi.

In an embodiment, the mobile device is a USB device.

In an embodiment, the SST has a wired interface port and wired communication module for communicating with one or more of: the mobile device and an SST server (such as ATM controller server 140 of the FIG. 1).

In an embodiment, the SST core application is the ATM core application 121 of the FIG. 1.

It is noted that the processing associated with the SST core application assumes that certificate and key configuration for cryptographic processing has already taken place through any out-of-band or in-band process (as discussed above with reference to the FIG. 1).

At 210, the SST core application presents an authentication token within a screen rendered to a display of the SST. This authentication token can take a variety of forms, some of which are discussed below. The purpose of the authentication token is to permit a user operating a mobile device to acquire the token for authentication to the SST. That is, when the authentication token is presented on the display, the user and mobile device of the user can only acquire the token if they are at the SST. So, this provides a proximity-based or location-based authentication technique of the user and of the mobile device being operated by the user.

According to an embodiment, at 211, the SST core application generates the authentication token in response to a wireless request sent from the mobile device to unlock an access door or panel associated with the SST to expose internal components and modules of the SST. Again, the wireless connection can be done using any of the wireless techniques discussed above with the FIG. 1.

In an embodiment of 211 and at 212, the SST core application creates the authentication token as a QR code that is encoded with a mobile device identifier for the mobile device operated by the user, an SST identifier for the SST, an indication of a wireless request to unlock an access door by the user, and a current date and time when the QR code was created or the wireless request was received.

In an embodiment at 213, the SST core application generates the authentication token in response to a request sent from a mobile device for obtaining access to an administrative interface of the SST as the authenticated access to the SST. Here, the access request is to access software resources or the SST via access to the administrative interface of the SST.

In an embodiment, at 214, the SST core application generates the authentication token in response to a request sent from a mobile device having a restricted wired connection to the SST. That is, the mobile device may be a USB device inserted into a USB port of the SST or the mobile device may have a cord that creates a wired connection between the mobile device and the SST, such as a USB connecting cord, and the like.

At 220, the SST core application obtains an access command from a server. This is an indication to the SST core application that the user and/or the mobile device of the user has been independently authenticated using the authentication token and other credentials possessed and provided by the user and/or mobile device. The access command when processed causes either: 1) an electronic lock to unlock the access panel or door to the SST for user access or 2) an administrative interface to be presented to the user on a display of the SST for the user to interact with software resources of the SST. However, for added security the SST core application requests independent validation of the access command, as discussed below at 230.

In an embodiment, at 221, the SST core application re-presents a new authentication token on the display when a configured period of time lapses before the access command is received from the server. That is, a start to a time value is set by the SST core application when the authentication token was presented at 210, the timer value ends upon receipt of the access command from the server, and the time value is compared against the configured period of time to determine whether the time for processing the access command has lapsed. This provides added security to ensure that the user and mobile device are still at the SST and not someone else. Moreover, as soon as the timer value exceeds the configured period of time, the SST core application can re-present a new authentication token on the display and ignore the access command received from the server.

At 230, the SST core application requests that a peripheral device (which is integrated within the SST) independently and cryptographically validate the access command before processing the access command providing authenticated access to the SST. This may be done to ensure that the access command was not spoofed by an entity posing to be the server that somehow gains access to the secure network connection between the SST and the server. At any rate, this provides added security and assurances to the SST core application that the access command is legitimate.

In an embodiment, at 231, the SST core application acts as an intermediary to forward encrypted information between the peripheral device and the server to assist and facilitate the peripheral device in independently validating the access command on behalf of the SST, the SST and the SST core application are incapable of decrypting that encrypted information providing even further security.

According to an embodiment, at 240, the SST core application sends at least some audit data to the server when the authenticated access is granted by the SST core application. This audit data can include a date and time, transaction identifier associated with the authentication token, and other information.

In an embodiment of 240 and at 241, the SST core application also maintains the audit data in a log on the SST independent of the server.

In an embodiment of 240 and at 242, the SST core application sends additional audit data to the server when the authenticated access is terminated. Again, this can include a variety of information, such as details of the authentication token, a transaction identifier, date and time of any re-locking of an access panel or termination of an administrative interface, and the like.

Figure 3:
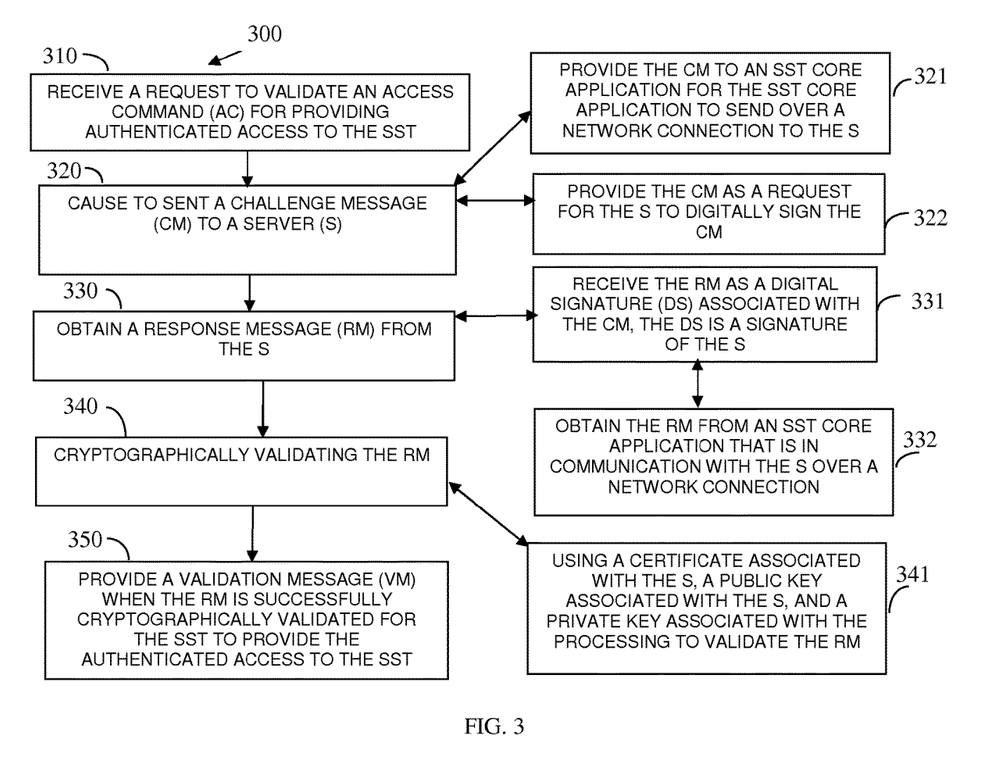
FIG. 3 is a diagram of another method for authenticated SST access, according to an example embodiment.

FIG. 3 is a diagram of another method 300 for authenticated SST access, according to an example embodiment. The software module(s) that implements the method 300 is referred to as a "cryptographic application." The cryptographic application is implemented as executable instructions programmed and residing within memory and/or a non-transitory computer-readable (processor-readable) storage medium and executed by one or more processors of a peripheral device integrated into the SST. The processors that execute the cryptographic application are specifically configured and programmed to process the cryptographic application. The expert application is devoid of any external network communication.

In an embodiment, the SST is the ATM 120 of the FIG. 1.

In an embodiment, the SST is a kiosk.

In an embodiment, the SST is a POS device.

In an embodiment, the peripheral device that the cryptographic application executes on is the EPP 123 of the FIG. 1.

In an embodiment, the peripheral device includes a Universal Serial Bus (USB) port and USB module for communicating with an external device through the USB port.

In an embodiment, the cryptographic application interacts with the SST core application of the FIG. 2 (discussed above) to provide cryptographic verification of an open SST command.

Again, the processing of the cryptographic application on the peripheral device (integrated within the SST) assumes that initial cryptographic information (keys and certificates) have been installed on peripheral device in secure storage and coordinated with a server for which cryptographic communications occur. This was discussed above with reference to the FIG. 1 and can be done with both in-band and out-of-band communications or at a time of manufacture of the peripheral device.

At 310, the cryptographic application receives (from within or internal to an SST) a request to validate an access for providing authenticated access to an SST.

At 320, the cryptographic application causes to be sent (from the SST) a challenge message to a server. The server alleged to have sent the access command being validated by the cryptographic application. The cryptographic application processes on the peripheral device integrated within the SST and that peripheral device lacks an external network connection; therefore, the cryptographic application requests that a core application that sent the access command for validation send the challenge message to the server because the core application does have access to a secure network connection for communicating directly with the server.

Thus, in an embodiment, at 321, the cryptographic application provides the challenge message to an SST core application for the SST core to send the challenge message over a secure network connection to the server.

According to an embodiment, at 322, the cryptographic application provides the challenge message as a request for the server to digitally sign the challenge message and send that back as a response message.

At 330, the cryptographic application obtains a response message from the server (through the intermediary core application).

In an embodiment, at 331, the cryptographic application receives the response message as a digital signature associated with the challenge message; the digital signature belonging to or purporting to belong to the server.

In an embodiment of 331 and at 332, the cryptographic application obtains the response message from an SST application that is in communication with the server over a network connection.

At 340, the cryptographic application cryptographically validates the response message. Some techniques for doing this were discussed above with reference to the FIG. 1.

According to an embodiment, at 341, the cryptographic application uses a certificate associated with the server and located in secure storage of the peripheral device, a public key associated with the server, and a private key associated with the cryptographic application (available only in the secure storage of the peripheral device) to validate the response message.

At 350, the cryptographic application provides a validation message when the response message is successfully cryptographically validated for the SST to process the access command to either: 1) electronically unlock ac access door of the SST for access by a user/customer engineer/service technician or 2) provide access to an administrative interface for the user to access software resources of the SST. When the access command is processed to the user is granted authenticated access to the SST.

Figure 4:
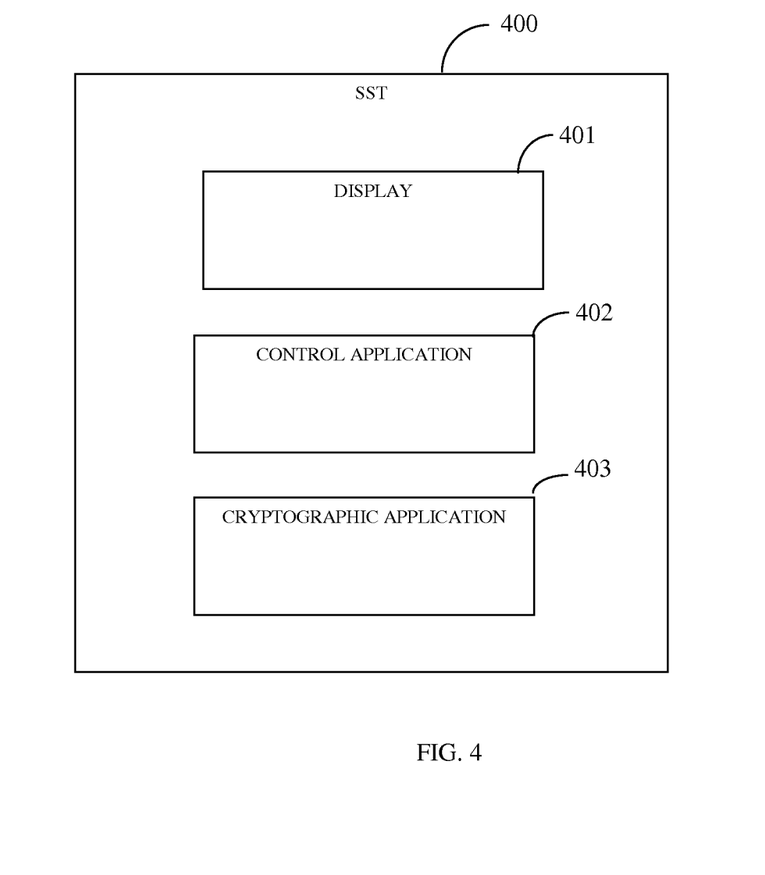
FIG. 4 is a diagram of an SST, according to an example embodiment.

FIG. 4 is a diagram of an SST 400, according to an example embodiment. The components of the SST 400 are programmed and reside within memory and/or a non-transitory computer-readable medium and execute on one or more processors of the SST 400. The SST 400 communicates one or more networks, which can be wired, wireless, or a combination of wired and wireless.

In an embodiment, the SST 400 is the ATM 120 of the FIG. 1.

In an embodiment, the SST 400 is a kiosk.

In an embodiment, the SST 400 is a POS device.

The SST 400 includes a display 401, a control application 402, and a cryptographic application 403.

The control application 402 is configured and adapted to: execute on the SST 400, receive an access SST request from a mobile device, provide a verification token for presentation on the display 401, provide a validation request to the cryptographic application 403, and provide authenticated access to the SST upon receipt of a verification from the cryptographic application that the validation request was validated.

In an embodiment, the control application 402 is the ATM core application 121 of the FIG. 1.

In an embodiment, the control application is the method 200 of the FIG. 2.

According to an embodiment, the control application 402 is further adapted and configured to establish a wireless connection with the mobile device to the SST 400 or a wired connection with the mobile device to the SST to receive the access SST request.

In an embodiment, the control application 402 is further adapted and configured to provide the authenticated access by one of: electronically unlocking an access panel to the SST 400 and granting access to an administrative interface of the SST 400.

The cryptographic application 403 is configured and adapted to: execute on a peripheral device integrated into the SST 400, send a challenge to an SST server through the control application 402, cryptographically validate a response provided back from the SST server through the control application 402, and provide the verification back to the control application 402 when the response is validated to grant authenticated access to the SST 400.

In an embodiment, the peripheral device that executes the cryptographic application 403 is the EPP 123 of the FIG. 1.

In an embodiment, the cryptographic application 403 is the method 300 of the FIG. 3.

According to an embodiment, the cryptographic application 403 is further adapted and configured to use a certificate associated with the SST server, a private key associated with the peripheral device, and a public key associated with the SST server to cryptographically validate the response.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   executing, by a processor of a Self-Service Terminal (SST), a SST core application from a non-transitory computer-readable storage medium;
   executing, by a peripheral device, a cryptographic application, wherein the peripheral device is connected to the SST over an internal wired connection to the SST;
   receiving, by the SST core application, a connection request for a wired or wireless connection between the SST and a mobile device operated by a customer engineer associated with the SST;
   establishing, by the SST core application, the wireless or the wired connection with the mobile device based on the connection request received by the SST from the mobile device of the customer engineer;
   displaying, by the SST core application, an authentication token on a display of the SST based on the establishing;
   obtaining, by the SST core application, an access command from a server over a network connection after the displaying;
   requesting, by the SST core application over an internal wired connection of the SST, a challenge message from the peripheral device based on the access command;
   producing, by the cryptographic application of the peripheral device, the challenge message based on the requesting of the challenge message;
   sending, by the cryptographic application of the peripheral device, the challenge message to the SST core application over the internal wired connection;
   sending, by the SST core application, the challenge message to the server over the network connection;
   receiving, by the SST core application, a digitally signed version of the challenge message back from the server;
   providing, by the SST core application, the digitally signed version of the challenge message to the cryptographic application of the peripheral device;
   validating, by the cryptographic application of the peripheral device, a digital signature from the digitally signed version of the challenge message against a server digital signature for the server;
   sending, by the cryptographic application of the peripheral device, over the internal wired connection, a message to the SST core application based on the validating;
   receiving, by the SST core application, the message from the cryptographic application over the internal wired connection;
   causing, by the SST core application, an electronic lock associated with a locked access door of the SST to unlock based the message; and
   displaying, by the SST core application, on the display of the SST an administrative interface allowing the customer engineer access to software resources of the SST through the administrative interface based on the message.

2. The method of claim 1, wherein establishing the wireless or the wired connection further includes:
   generating, by the SST core application, the authentication token based on the receiving.

3. The method of claim 2, wherein generating the authentication token further includes:
   encoding, by the SST core application, a mobile device identifier for the mobile device, an SST identifier for the SST, an indication of the wireless request, and a current date and time;

creating from the encoding a Quick Response (QR) code; and displaying the QR code as the authentication token on the display.

4. The method of claim 1, wherein establishing further includes:

receiving, by the SST core application, the connection request from the mobile device over a restricted wired connection between the SST and a mobile device; and generating, by the SST core application, the authentication token based on the connection request.

5. The method of claim 1, wherein obtaining further includes:

starting, by the SST core application, a timer;

detecting, by the SST core application, that a period of time has lapsed while waiting to receive the access command from the server based on a timer value for the timer by comparing the time value against the period of time and determining that the timer value exceeds the period of time;

replacing, by the SST core application, the authentication token on the display; and iterating, by the SST core application, back to the starting of the timer until the access command is received from the server.

6. The method of claim 1 further comprising:

processing the SST core application as an intermediary between the peripheral device and the server, wherein the SST core application of the SST forwards encrypted information between the peripheral device and the server;

wherein the SST core application and the SST are incapable of decrypting the encrypted information.

7. The method of claim 1 further comprising, sending, by the SST core application, at least some audit data to the server associated with the access command.

8. The method of claim 7, wherein sending the at least some audit data to the server further includes maintaining, by the SST core application, the at least some audit data in a log on the SST before sending the at least some audit data from the SST to the server.

9. The method of claim 8, wherein sending further includes:

detecting, by the SST core application, a termination of the access; and sending, by the SST core application, an additional audit data to the server based on the detecting.

* * * * *